United States Patent [19]

Brown

[11] 4,061,401

[45] Dec. 6, 1977

[54] PNEUMATICALLY OPERATED CONVEYOR SYSTEMS FOR PULVERULENT OR PARTICULATE MATERIALS

[76] Inventor: Roy William Brown, 29 Fairwater Road, Llandaff, Cardiff, Glamorganshire, Wales

[21] Appl. No.: 643,907

[22] Filed: Dec. 23, 1975

[30] Foreign Application Priority Data

Jan. 8, 1975 United Kingdom .............. 744/75

[51] Int. Cl.² .............................................. B65G 53/66
[52] U.S. Cl. .................................. 302/41; 222/193; 302/42; 302/53
[58] Field of Search ................. 302/26, 35, 41, 42, 302/51, 52, 53, 57; 222/193, 195

[56] References Cited

U.S. PATENT DOCUMENTS

| 1,935,843 | 11/1933 | Goebels | 302/53 |
| 2,221,741 | 11/1940 | Vogel-Jorgensen | 302/53 |
| 2,668,085 | 2/1954 | Baresch | 302/53 |
| 2,826,459 | 3/1958 | Oetiker | 302/35 |
| 3,372,958 | 3/1968 | Black | 302/53 |
| 3,437,384 | 4/1969 | Bozich | 302/53 |
| 3,762,691 | 10/1973 | Troy | 222/193 |
| 3,858,943 | 1/1975 | Bose et al. | 302/41 |
| 3,861,830 | 1/1975 | Johnson | 302/53 |

*Primary Examiner*—John J. Love
*Assistant Examiner*—Jeffrey V. Nase
*Attorney, Agent, or Firm*—Ulle C. Linton

[57] ABSTRACT

This invention relates to a pneumatic conveying system for pulverulent and particulate materials and provides a system adapted to operate at a high frequency of despatch with low material velocities and relatively low pressures and low volumes of air in relation to the material, the system being characterized in that a material despatch vessel has an automatic non-return outlet valve, a fill valve, an arrangement for venting air which enables the rapid filling of the vessel, a pneumatic system to ensure a firm closure of the despatch vessel's fill valve, a pneumatic system to regulate the despatch of material in accordance with the pressures obtaining in the conveying pipe line.

9 Claims, 1 Drawing Figure

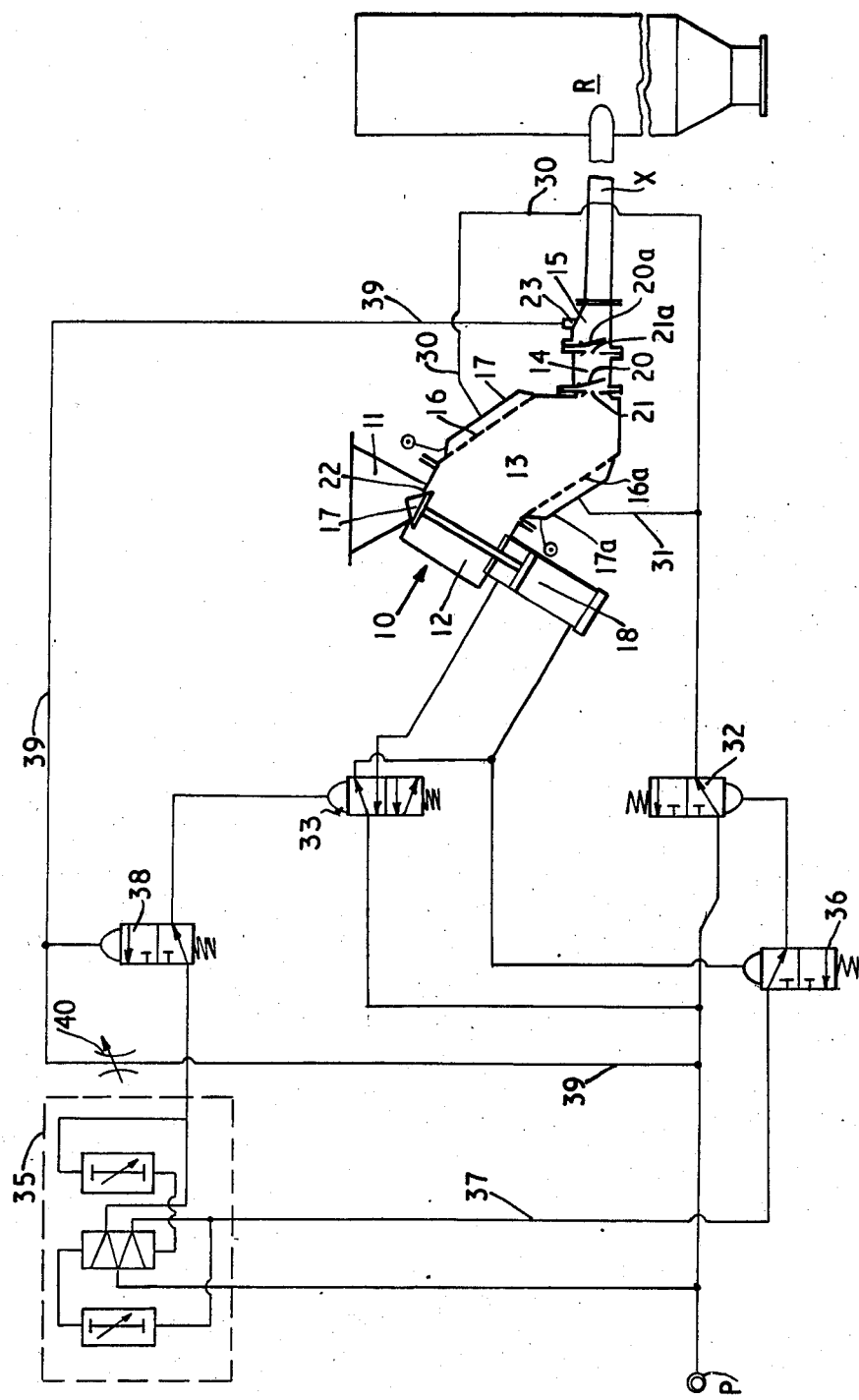

PNEUMATICALLY OPERATED CONVEYOR SYSTEMS FOR PULVERULENT OR PARTICULATE MATERIALS

This invention relates to the pneumatic conveying of pulverulent and particulate materials and has for its object to provide improvements in conveyor systems of the kind arranged to operate at a high frequency of despatch, with low material velocities and relatively low pressures and low volumes of air in relation to material.

Apparatus of the kind to which the invention specifically refers broadly comprises a relatively small despatch vessel, a conveying pipe line for connecting the despatch vessel with a receiving vessel, a fill valve for feeding material to be coneyed into the despatch vessel and control means for alternately operating the fill valve and applying pressure air to the despatch vessel for intermittently discharging material into the conveying pipe line, the frequency of fill/discharge being in the region 6 to 60 per minute.

In further development of a high frequency conveying system as referred to it has been found that the conveying capacity of the system will be considerably enhanced if:

a. The despatch vessel is provided with an automatic outlet valve which enables pressure to be affectively held in the conveying line when the despatch vessel fill valve is opened;

b. The air contained in the despatch vessel is vented in a manner such as to obtain rapid filling of the despatch vessel;

c. The control circuit is arranged so that conveying air is not supplied to the despatch vessel until the fill valve is firmly closed; and d. A means is provided to regulate the rate of despatch of material in accordance with the pressure in the conveying pipe line.

It is an object of this invention to provide conveying means of the kind referred to embodying the above recited desiderata.

Accordingly, the present invention in one embodiment comprises a high frequency conveying system of the kind referred to characterised in that the despatch vessel comprises an automatic non-return outlet valve, air vent means to enable a rapid filling of said despatch vessel, control means to ensure a firm closure of the fill valve before conveying air is admitted to the despatch vessel, and means to regulate the despatch of material in accordance with the pressures obtaining in the conveying pipe line.

The above referred to improvements or modifications relate more specifically to a high frequency conveying system of the kind referred to when operated so that the discharge cycle of the despatch vessel is operated in phase with operation of a series of air injectors fitted in the conveying pipe line.

The invention is further described with reference to the attached drawing which illustrated schematically and by the way of example only a material despatch vessel and associated control means.

Referring to said drawings the material despatch vessel, generally designated 10, comprises five main parts namely, an entry piece 11, a fill valve 12, a main body 13, an outlet valve 14, and a connector 15 for connecting the vessel with a conveying pipe line X leading to a receiving vessel R.

The entry piece 11 serves to receive material from a supply vessel (not shown) and to conduct material to the fill valve 12. The fill valve 12, in the construction shown, is directly operated by a piston and cylinder device 18 arranged to be cushioned on its opening stroke only, and which has a cone head closure 17 arranged to engage with a seating ring 22 in the valve 12. The vessel body 13 is arranged with two openings closed by permeable membranes 16, 16a having external enclosures 17, 17a connected with air lines 30, 31. Said permeable membranes are essentially low resistance membranes and function in one mode of operation as fluidisers for material in the despatch vessel 10. Pressure air can be applied through said membranes to discharge material from the vessel 10, and air may also be freely vented therethrough whilst the vessel 10 is being filled with material. Said membranes 16, 16a may be of a composite nature, e.g. composed of stainless steel mesh and nylon or other fabric.

In the arrangement shown, the automatic outlet valve 14 comprises two appropriately shaped flexible flap valves 20, 20a sealing against orifice plates 21, 21a. It has been found that this dual tandem formation provides an effective sealing against substantial air pressures in the conveying line X. In the connector 15 there is a union fitting 23 through which the conveying line air pressure is sensed for a purpose hereinafter explained.

The air lines 30, 31 are of relatively large diameter and connect the two membrane enclosures 17, 17a to a main air valve 32 operated by a pilot with return spring. In one position of the valve 32 pressure air is applied through said membranes 16, 16a and thus to the body of the vessel 10 to despatch material therefrom. In the other valve position air is permitted to rapidly vent to atmosphere via the membranes 16, 16a on being displaced by material flowing into the despatch vessel 10.

Operation of the fill valve's piston and cylinder device 18 is controlled by a five port valve 33 having a spring return. The action of valves 32 and 33 is controlled by a pneumatic logic flip-flop unit 35 with variable timing whereby the length of time during which the fill valve 12 is open, and during which time conveying air is applied through the air valve 32, is variable and can be set to provide an optimum, or required, performance.

In order to ensure that conveying air from the source P is not applied to the despatch vessel 10 before the fill valve 12 is firmly closed, an interrupter valve 36 is interposed in a signal line 37 extending between the logic flip-flop unit 35 and the main air valve 32. The pilot of the interrupter 36 is operated by the closing pressure of the piston and cylinder device 18. The main air valve 32 is thus prevented from opening until the resistance to movement of the piston of the device 18 as imposed by the valve head 17 reaching its seating 22 creates a back pressure sufficient to open the interrupter 36 and allow a signal to pass to the main air valve 32.

The operating valve 33 for the piston and cylinder device 18 is similarly provided with a pilot operated interrupter valve 38 which is arranged to be normally open. The pilot of valve 38 in this case is connected by a continuously purged control line 39, fitted with a regulator 40, to the union fitting 23 of the connector 15. The spring rate of the interrupter valve 38 may be adjustable and so arranged that the signal to the valve 33 will be interrupted when the conveying line pressure reaches a value which is determined by the spring setting of the interrupter valve 38. Since the back pressure developed in the conveying line X is related to the density of material in the line, interruption of the signal to the fill valve 12 in this way reduces the density of material in the line X, and as in each cycle it is arranged for a normal volume of conveying air to be injected into the line this limits line pressure and obviates line blockage. Adjustment of the set pressure of the interrupter 38 when provided permits compensation for the effects generated by the length of the conveying line and variations in the properties of materials being handled.

Operational sequence of the apparatus is thus as follows:

The conveyor once connected to the convey line and air supply is operated by merely turning on and off the air supply.

Starting with the conveyor empty, at the instant the inlet valve 17 closes, pressure under the piston of cylinder 18 is sensed by interrupter valve 36 which opens to allow a timed signal from the controller 35 to pass via line 37 to the main air valve 32 which opens and admits conveying air through the membranes 16 and 16a to the despatch vessel 10 and through the non-return flap valves 20, 20a, to the convey line X.

At the expiration of the 'blow time' interval in the controller 35 a flip-flop in the controller reverses, valve 32 shuts off the conveying air and vents the membranes 16 and 16a to the atmosphere, valves 33 operates and the material inlet valve 17 opens. Material flows into the despatch vessel 10 by gravity, displaced air being vented through the membranes 16 and 16a. When the 'fill time' interval expires the flip-flop again reverses, valve 33 operates, the material inlet valve 17 closes, and when closed, pressure below the piston of cylinder 18 allows the cycle to repeat.

On following cycles air and material pass through the double flap valves 20, 20a into the line X during the blow time and depending on line conditions the the line back pressure builds up as material is conveyed.

If the pressure in line X exceeds a preset figure, the material inlet interrupter valve 38 operates through valve 33 to hold or return the material fill valve 17 in the closed position, where it remains until sufficient air has entered the convey line in succeeding 'blow' cycles to reduce the line pressure to below the preset figure, allowing material valve 17 to cycle normally.

What I claim as my invention and desire to secure by Letters Patent is:

1. A high frequency pneumatic conveying system for pulverulent or particulate material comprising a despatch vessel, a conveying pipe line being connected to said despatch vessel for connecting said despatch vessel with a receiving vessel, a piston and cylinder operated fill valve being mounted in said despatch vessel for admitting material to be conveyed into said despatch vessel, and control means for alternately operating said fill valve and applying pressure air to said despatch vessel for intermittently discharging material in the despatch vessel into said pipe line, said despatch vessel having a non-return outlet valve, air vents in said despatch vessel in the form of permeable low resistance membranes which in one mode of operation permit rapid filling of said despatch vessel by rapid venting of air therefrom and in another mode of operation act as fluidizers for material in the despatch vessel, a control means for ensuring a firm closure of said fill valve before conveying air is admitted to said despatch vessel, and means to regulate said despatch of material in accordance with the air pressure in said conveying pipe line.

2. A high frequency conveying system as claimed in claim 1, wherein said despatch vessel comprises a main body part, an opening material to be despatched, and a connector for connecting said outlet valve to said conveying pipe line.

3. A high frequency conveying system as claimed in claim 1, wherein said permeable low resistance membranes being composed of stainless steel mesh and nylon fabric.

4. A high frequency conveying system as claimed in claim 1, wherein said automatic non-return outlet valve comprises two flap valves arranged in tandem.

5. A high frequency conveying system as claimed in claim 1 including external enclosures of said despatch vessel surrounding said permeable membranes, a pilot operated main air valve having a spring return, air lines connecting said air valve with said external enclosures, said valve having one position wherein air applied to said external enclosure passes through said membranes to the body of said despatch vessel and a second position wherein air displaced by material entereing said body is permitted to vent rapidly from said body via said membranes and external enclosures.

6. A high frequency conveyor system as claimed in claim 5, including a spring returned five port valve operatively connected to said piston and cylinder device, and a pneumatic logic flip-flop unit with variable timing being operatively connected to said main valve and said five port valve for controlling the same.

7. A high frequency conveyor system as claimed in claim 6, wherein an interrupter valve is interposed in a signal line extending between said logic flip-flop unit and said main air valve, a pilot of said interrupter valve being operated by the closing pressure of said piston and cylinder device of said filling valve whereby said main air valve will not open until said fill valve is firmly closed.

8. A high frequency conveying system as claimed in claim 7, wherein a spring returned normally open pilot operated interrupter valve is provided in respect of said five port valve controlling said piston and cylinder device of said fill valve, the pilot of said interrupter valve being connected with a continuously purged control line connected by a union with the conveying pipe line.

9. A high frequency conveying system as claimed in claim 8, wherein the spring return of said interrupter valve is adjustable and a regulator is provided in said purged control line.

* * * * *